(12) United States Patent
Hotta et al.

(10) Patent No.: US 7,434,837 B2
(45) Date of Patent: Oct. 14, 2008

(54) KNEE-PROTECTING AIRBAG DEVICE

(75) Inventors: Naoki Hotta, Nishikasugai-gun (JP);
Yoshio Mizuno, Nishikasugai-gun (JP);
Atsushi Nagata, Nishikasugai-gun (JP);
Hiroki Tanaka, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 236 days.

(21) Appl. No.: 11/265,501

(22) Filed: Nov. 3, 2005

(65) Prior Publication Data

US 2006/0108780 A1 May 25, 2006

(30) Foreign Application Priority Data

Nov. 9, 2004 (JP) .............................. 2004-325238

(51) Int. Cl.
*B60R 21/16* (2006.01)
*B60R 21/233* (2006.01)

(52) U.S. Cl. .................. 280/743.2; 280/729; 280/730.1

(58) Field of Classification Search ................ 280/742, 280/743.1, 730.1, 729, 743.2
See application file for complete search history.

(56) References Cited

U.S. PATENT DOCUMENTS

| | | | | |
|---|---|---|---|---|
| 4,262,931 A * | 4/1981 | Strasser et al. | ............... | 280/729 |
| 5,692,774 A * | 12/1997 | Acker et al. | ................ | 280/729 |
| 5,697,641 A * | 12/1997 | McGee et al. | ............ | 280/743.1 |
| 5,853,191 A * | 12/1998 | Lachat | ..................... | 280/730.2 |
| 6,364,348 B1 * | 4/2002 | Jang et al. | ................ | 280/730.2 |
| 6,450,529 B1 * | 9/2002 | Kalandek et al. | ......... | 280/730.2 |
| 6,715,789 B2 * | 4/2004 | Takimoto et al. | ......... | 280/730.1 |
| 6,752,417 B2 * | 6/2004 | Takimoto et al. | ......... | 280/730.1 |
| 6,916,039 B2 * | 7/2005 | Abe | .......................... | 280/729 |
| 6,945,557 B2 * | 9/2005 | Takimoto et al. | ......... | 280/730.1 |
| 7,147,247 B2 * | 12/2006 | Hayakawa | ................. | 280/740 |
| 7,350,801 B2 * | 4/2008 | Nakayama | ............... | 280/730.1 |
| 2002/0171230 A1 * | 11/2002 | Takimoto et al. | ......... | 280/730.1 |
| 2002/0171231 A1 * | 11/2002 | Takimoto et al. | ......... | 280/730.1 |
| 2003/0120409 A1 * | 6/2003 | Takimoto et al. | .............. | 701/45 |
| 2004/0201209 A1 * | 10/2004 | Schwark et al. | .......... | 280/743.1 |

(Continued)

FOREIGN PATENT DOCUMENTS

JP        A-2002-337649        11/2002

OTHER PUBLICATIONS

Office Communication from European Patent Office issued on Mar. 2, 2006 for the corresponding European patent application No. 05024007.6-2421 (a copy thereof).

*Primary Examiner*—Ruth Ilan
*Assistant Examiner*—Karen Amores
(74) *Attorney, Agent, or Firm*—Posz Law Group, PLC

(57) ABSTRACT

The knee-protecting airbag device includes an airbag that protrudes rearward from a housing and deploys upward when fed with inflation gas. The airbag includes an upstream part located toward lower end of the completely inflated airbag and located upstream of inflation gas, and a downstream part located toward upper end of the completely inflated airbag and located downstream of inflation gas. The downstream part is adapted to protect an area from shins to knees of an occupant when the airbag is completely inflated. In the course of airbag inflation, internal pressure of a shin-protecting area, which is part of the downstream part for protecting shins, peaks 5 to 15 ms later than a peak time of internal pressure of the upstream part.

4 Claims, 13 Drawing Sheets

U.S. PATENT DOCUMENTS

| | | | |
|---|---|---|---|
| 2004/0207183 A1* | 10/2004 | Nagata et al. | 280/730.1 |
| 2005/0006880 A1* | 1/2005 | Nakayama | 280/730.1 |
| 2005/0057028 A1* | 3/2005 | Hayakawa | 280/740 |
| 2005/0134024 A1* | 6/2005 | Kumagai et al. | 280/730.1 |
| 2005/0151351 A1* | 7/2005 | Enders et al. | 280/730.1 |
| 2005/0189741 A1* | 9/2005 | Abe et al. | 280/730.1 |
| 2005/0230939 A1* | 10/2005 | Abe et al. | 280/728.2 |
| 2006/0108780 A1* | 5/2006 | Hotta et al. | 280/732 |
| 2007/0045998 A1* | 3/2007 | Kashiwagi | 280/730.1 |
| 2007/0090632 A1* | 4/2007 | Kashiwagi | 280/730.1 |
| 2007/0126212 A1* | 6/2007 | Takimoto et al. | 280/730.1 |

* cited by examiner

KNEE-PROTECTING AIRBAG DEVICE

The present application claims priority from Japanese Patent Application No. 2004-325238 of Hotta et al., filed on Nov. 9, 2004, the disclosure of which is hereby incorporated into the present application by reference.

BACKGROUND OF THE INVENTION

1. Field of the Invention

The present invention relates to a knee-protecting airbag device equipped with an airbag which, when fed with inflation gas, protrudes rearward of vehicle from a housing, and deploys upward for protecting knees of an occupant.

2. Description of the Related Art

In the prior art, JP 2002-337649 discloses a knee-protecting airbag device equipped with an airbag which includes an airbag body constructed of an occupant side wall and vehicle body side wall, and a tether located within the airbag body. The tether joins the occupant side wall and the vehicle body side wall together for regulating a thickness of the airbag body when inflated, so that the airbag is prevented from pressing occupant's knees unduly.

However, in this knee-protecting airbag device of the prior art, a downstream part of the airbag, which is located in downstream side of inflation gas and serves to protect an area from shins to knees of an occupant upon airbag inflation, is constructed to complete inflation generally concurrently with an upstream part located in upstream side of inflation gas in the airbag. This construction leaves room for improvement, when the airbag is inflated in a condition that the occupant's legs are disposed proximate to the vehicle body, in softly protecting shins of the occupant that are located especially proximate to the vehicle body.

SUMMARY OF THE INVENTION

The present invention aims to provide a knee-protecting airbag device which is capable of protecting shins of an occupant softly in the event that legs of the occupant are disposed proximate to the vehicle body.

The object of the present invention is achieved by the knee-protecting airbag device constructed as follows:

the knee-protecting airbag device includes an airbag which protrudes rearward from a housing and deploys upward for protecting occupant's knees, when fed with inflation gas. The airbag includes an upstream part located toward lower end of the completely inflated airbag and located upstream of inflation gas, and a downstream part located toward upper end of the completely inflated airbag and located downstream of inflation gas. The downstream part is adapted to protect an area from shins to knees of the occupant when the airbag is completely inflated, and includes a shin-protecting area for protecting occupant's shins. The airbag is constructed such that, in a course of inflation, internal pressure of the shin-protecting area peaks 5 to 15 ms later than a peak time of internal pressure of the upstream part.

In the knee-protecting airbag device according to the present invention, upon airbag inflation, internal pressure of the shin-protecting area peaks 5 to 15 ms later than the peak time of internal pressure of the upstream part. This means that the internal pressure in the downstream part rises gradually in the course of inflation. Accordingly, even when the airbag inflates in a condition that occupant's legs are located proximate to the vehicle body, the inflating shin-protecting area of the downstream part does not press the shins unduly, so that the occupant's shins are protected softly. If the time lag between the peak times of internal pressures of the shin-protecting area and the upstream part is less than 5 ms, the time lag is so small that the shin-protecting area may press shins of the occupant during inflation. On the contrary, the time lag surpassing 15 ms may delay inflation of the downstream part, and hinder a knee-protecting area for protecting occupant's knees from securing enough internal pressure, so that occupant's knees may not be protected properly.

In the knee-protecting airbag device according to the present invention, therefore, occupant's shins are protected softly even if occupant's legs are located proximate to the vehicle body.

In the knee-protecting airbag device constructed as above, it is desired that the airbag includes an airbag body including an occupant side wall located toward the occupant and a vehicle body side wall located toward the vehicle body, respectively when the airbag is completely deployed, and a regulating tether located within the airbag body, the regulating tether joining the occupant side wall and the vehicle body side wall for regulating thickness of the airbag body as completely inflated, the tether being arranged generally along transverse direction of the airbag body in such a manner as to partition the upstream part and the shin-protecting area, and that a sectional area of flow path of inflation gas flowing toward the shin-protecting area from the upstream part in the regulating tether is controlled, such that there arises the time lag between the peak times of internal pressures of the shin-protecting area and of the upstream part.

With this construction, the time lag between the peak times of internal pressures of the upstream part and the shin-protecting area is set up by the regulating tether located between the upstream part and the shin-protecting area. This construction is easily made merely by a design change of a tether of airbag which has been conventionally used in a knee-protecting airbag device, which contributes to reduce manufacturing cost and number of parts.

In the above knee-protecting airbag device, it is further desired that the regulating tether is joined to all over inner circumference of the airbag body, and includes a gas communication hole that allows the inflation gas to pass therethrough.

In the knee-protecting airbag device thus constructed, the upstream part and the shin-protecting area is partitioned by the regulating tether, and inflation gas fed to the upstream part then flows into the shin-protecting area in the downstream part via the communication hole in the regulating tether. Accordingly, in the initial stage of airbag inflation, inflation gas comes to enter into the shin-protecting area in a phase the upstream part has completed inflation partway, and thus, the peak time of internal pressure of the shin-protecting area is securely delayed than the peak time of internal pressure of the upstream part. In addition, in the present airbag device, the upstream part expands widely in transverse direction in the initial stage of airbag inflation. Accordingly, expansion of the downstream part thereafter goes smoothly.

In the above knee-protecting airbag device, moreover, it is desired: that the airbag includes more than one tether located within the airbag body and arranged in a row in vertical direction, each of the tethers joining the occupant side wall and the vehicle body side wall for regulating thickness of the airbag body as completely inflated, and each of the tethers extending generally along transverse direction of the airbag body; that one of the tethers is the regulating tether, and one of the rest of the tethers constitutes a partitioning tether for partitioning the shin-protecting area for protecting shins and a knee-protecting area for protecting knees, in the downstream part; and that a sectional area of flow path of inflation gas flowing toward the shin-protecting area from the upstream part in the regulating tether is set smaller than a sectional area of flow path of inflation gas flowing upward in each of locations of the tethers except the regulating tether.

With this construction, since the downstream part is provided with the partitioning tether partitioning the shin-protecting area and the knee-protecting area, thickness of the downstream part is controlled by the partitioning tether during airbag inflation, and the shin-protecting area is prevented from inflating thickly in such a manner as to press occupant's shins. In addition, since the sectional area of flow path of inflation gas in the location of the regulating tether is set smaller than the sectional area of flow path of inflation gas in each of the locations of other tethers, the peak time of internal pressure of the shin-protecting area is securely delayed.

Furthermore, in the knee-protecting airbag device constructed as above, it is desired that each of the regulating tether and the partitioning tether is joined to all over inner circumference of the airbag body, and includes a gas communication hole that allows the inflation gas to pass therethrough.

With this construction, a flow path of inflation gas is constituted by the gas communication holes formed in each of the tethers. Accordingly, the sectional area of flow path of inflation gas can be adjusted by merely changing an opening area of each of the gas communication holes, and setting of the sectional area of flow path is facilitated in comparison with a case in which, for example, a tether is joined to part of an airbag body, not to all over inner circumference thereof, such that a gas flow path is provided between a base cloth forming the airbag body and the tether.

It is additionally desired in the knee-protecting airbag device constructed as above, that each of the regulating tether and the partitioning tether includes more than one gas communication hole disposed side by side along transverse direction, and that the gas communication holes of the regulating tether and the gas communication holes of the partitioning tether are in series configuration with one another in vertical direction.

With this construction, inflation gas flown into the shin-protecting area from the upstream part via the communication holes of the regulating tether directly reaches upper end of the knee-protecting area, via the communication holes of the partitioning tether arranged in series with the communication holes of the regulating tether, and therefore, the knee-protecting area inflates swiftly.

Of course, the gas communication holes of the regulating tether and the gas communication holes of the partitioning tether may be arranged in such a manner as dislocated from one another in transverse direction, as viewed from above.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
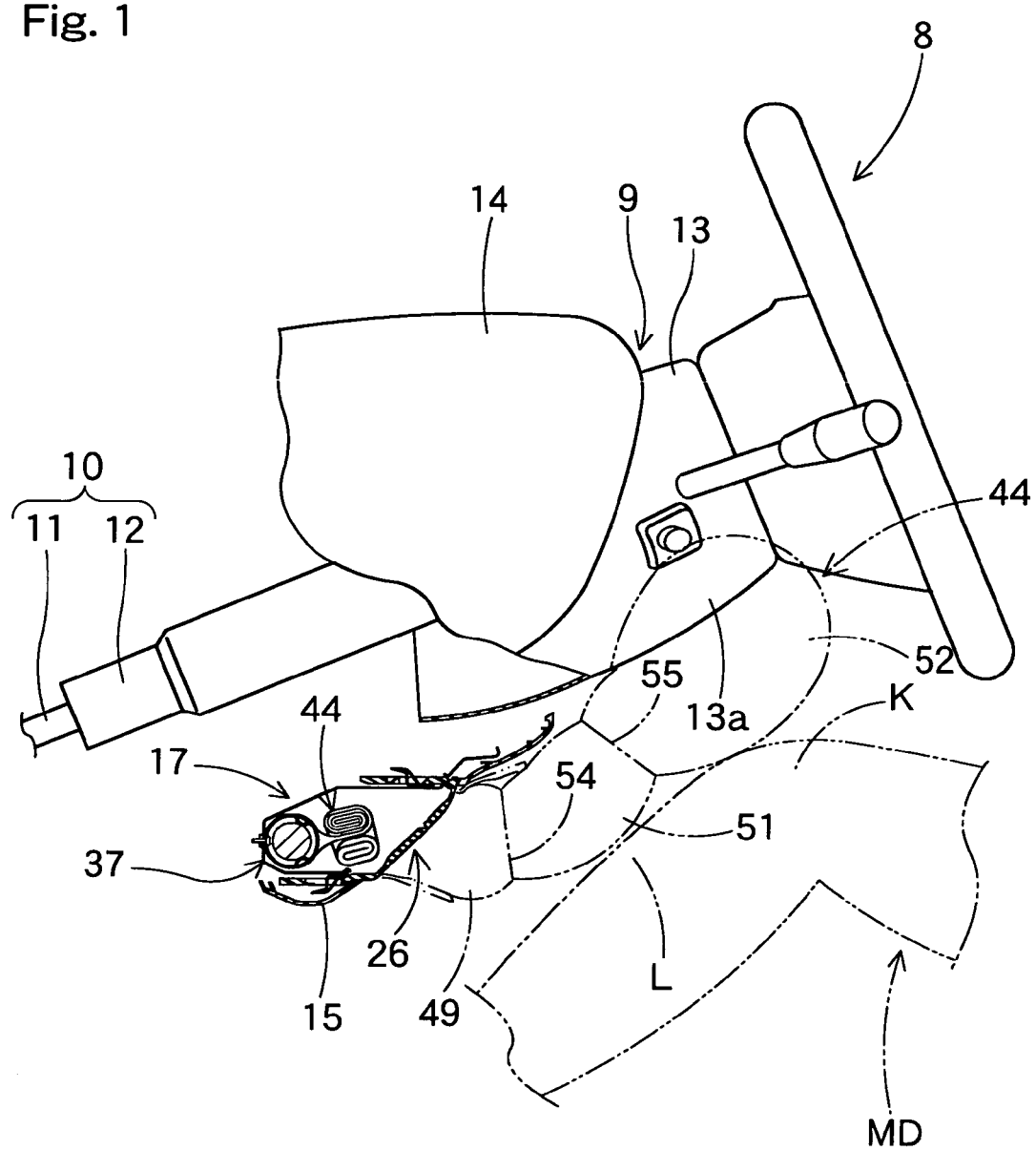
FIG. 1 is a schematic vertical section of an embodiment of a knee-protecting airbag device according to the present invention in service, taken along the front-rear direction of vehicle.
Figure 4:
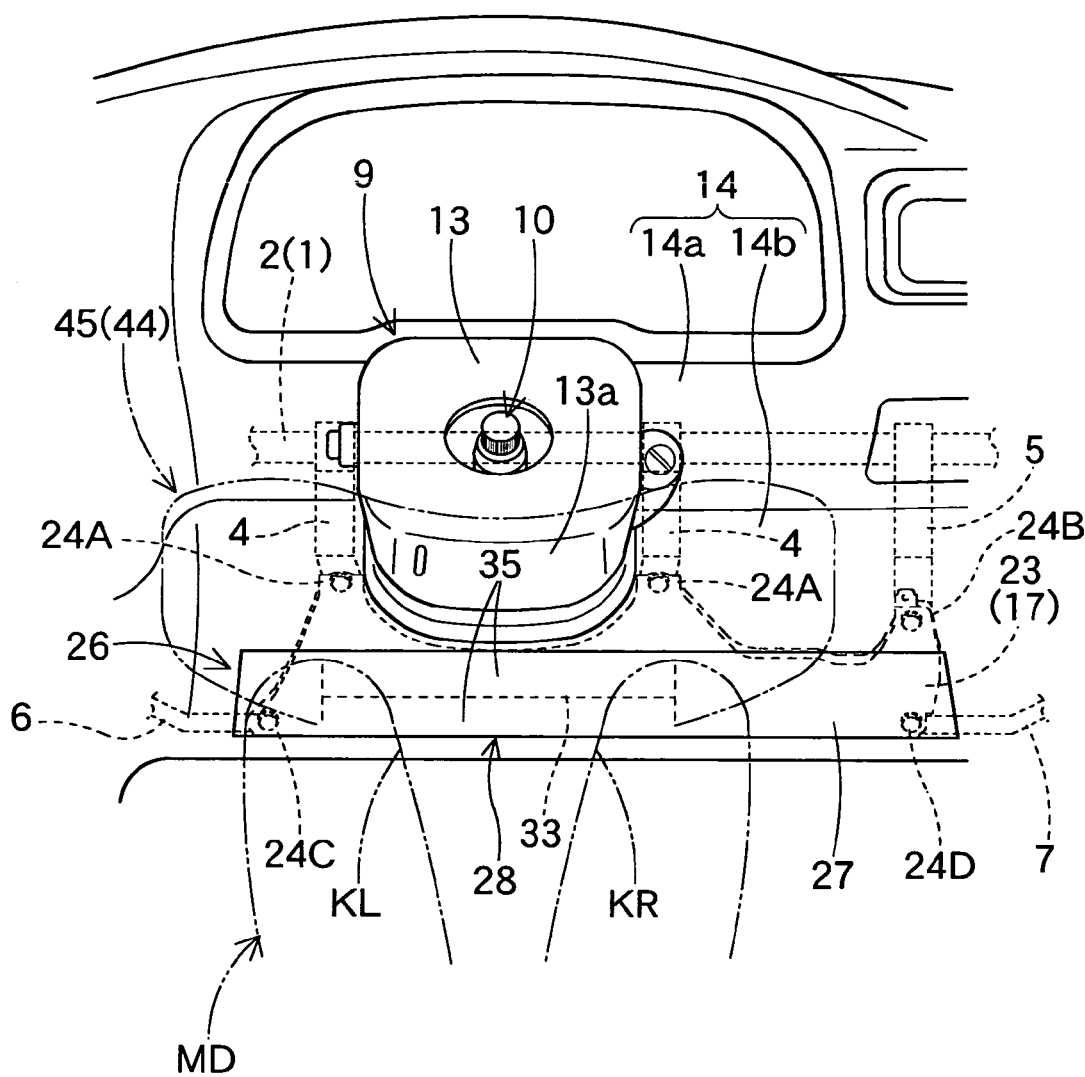
FIG. 4 is a schematic front view of the knee-protecting airbag device of FIG. 1 in service, as viewed from rearward.

As shown in FIGS. 1 and 4, the knee-protecting airbag device S according to an embodiment of the present invention is located below the steering column 9 and in front of a driver MD as an occupant for protecting knees K (KL and KR) of the driver MD.

Up-down, left-right, and front-rear, in this specification correspond to up-down, left-right, and front-rear of the vehicle with the airbag device mounted thereon.

Referring to FIG. 1, the steering column 9 includes a column body 10 connected to the steering wheel 8 and a column cover 13 covering the column body 10 below the steering wheel 8. The column body 10 includes a main shaft 11 and a column tube 12 covering the main shaft 11.

The column cover 13 is made from synthetic resin into a generally square tubular shape, and is so located along the axial direction of the column body 10 as to cover the column body 10. A rear side 13a of the column cover 13 protruded from an instrument panel (as will be called "dashboard" herein below) 14 is formed into a generally curved rectangular plate shape ascending upward as it goes backward.

The knee-protecting airbag device S includes a folded airbag 44, an inflator 37 for supplying the airbag 44 with inflation gas, a housing 17 opened rearward for housing the folded airbag 44 and the inflator 37, and an airbag cover 26 for covering rearward of an opening 18a of the housing 17.

Figure 2:
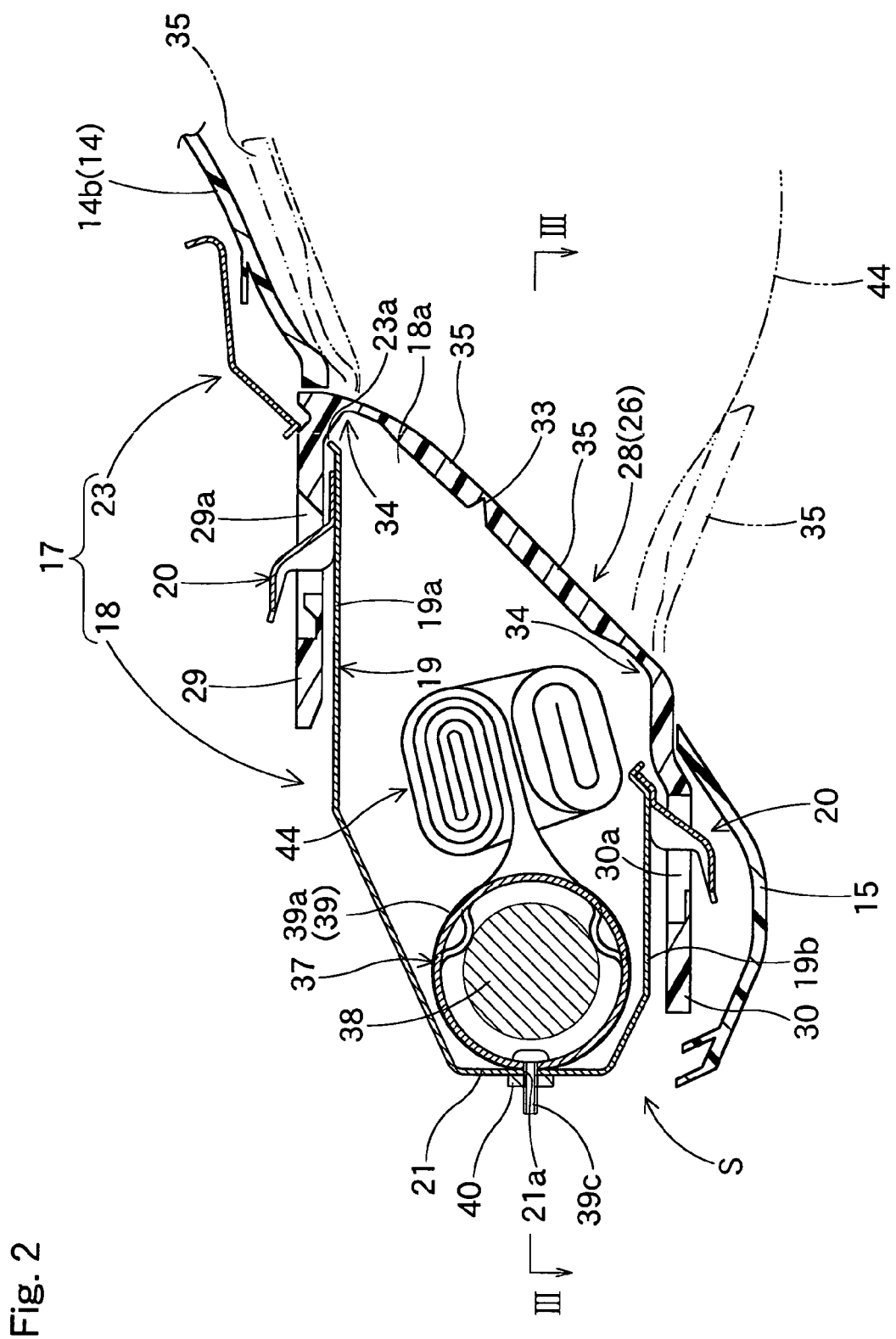
FIG. 2 is a schematic enlarged vertical section of the knee-protecting airbag device of FIG. 1, taken along the front-rear direction of vehicle.
Figure 3:
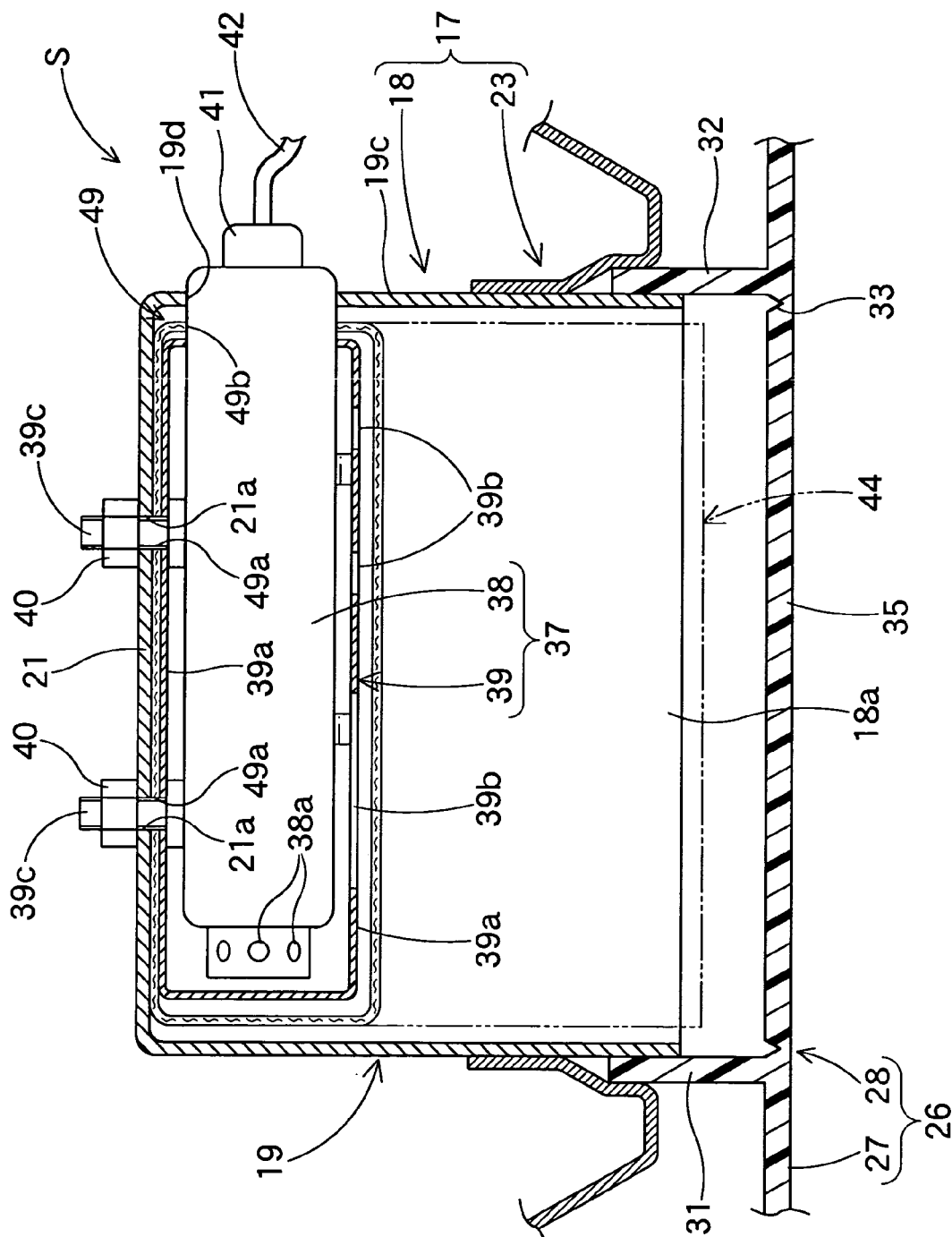
FIG. 3 is a schematic section taken along line III-III in FIG. 2.

The housing 17 is made of sheet metal. Referring to FIGS. 2 to 4, the housing 17 is located below the steering column 9, and includes a box-shaped main body 18 and a panel portion 23 extending outwardly from the main body 18. The main body 18 includes a generally square tubular circumferential wall portion 19, a bottom wall 21 for closing front side of the circumferential wall portion 19, and a generally rectangular opening 18a located at rear side. The circumferential wall portion 19 is provided, on outer surfaces of its walls 19a and 19b confronting each other in the vertical direction, with a plurality of retaining pawls 20 for attaching later-described upper and lower joint walls 29 and 30 of the airbag cover 26 to the housing 17. In the illustrated embodiment, the retaining pawls 20 are formed as part of the panel portion 23, and are separate from the main body 18. Each of the retaining pawls 20 has a generally L-shaped section, and is adapted to be inserted into a retaining hole 29a or 30a in the joint wall 29 or 30 of the airbag cover 26, and retains a periphery of the retaining hole 29a or 30a.

Referring to FIG. 3, the circumferential wall portion 19 is further provided on one of its lateral side walls 19c with an insert hole 19d for inserting a later-described main body 38 of the inflator 37 therethrough. The bottom wall 21 is provided with two insert holes 21a for inserting bolts 39c of the inflator 37 thereinto.

The panel portion 23 is formed separately from the main body 18, and arranged to encircle the opening 18a of the housing 17. As shown in FIG. 4, the panel portion 23 includes joint portions 24 for securing the housing 17 to the vehicle body 1. In the illustrated embodiment, the joint portions 24 are located in five positions of the panel portion 23: in two positions above the main body 18, in a position proximate to a left lower corner, and in positions proximate to upper and lower ends of right side. The vehicle body 1 includes brackets 4, 5, 6 and 7 for receiving the respective joint portions 24. The brackets 4 and 5 to which the joint portions 24A and 24B located in the upper side are joined extend from dashboard reinforcement 2 as part of the vehicle body 1. The brackets 6 and 7 to which the joint portions 24C and 24D located in the lower side are joined respectively extend from unillustrated center brace and front body pillar or the like as part of the vehicle body 1, respectively. The panel portion 23 further includes a slit 23a for inserting an upper side wall 29 of the airbag cover 26 thereinto, as shown in FIG. 2.

The airbag cover 26 is formed of thermo-plastic elastomer of olefin or the like, and is so attached to the housing 17 as to cover the rearward of the housing 17. The airbag cover 26 is located in part of a lower panel 14b of the dashboard 14 which is composed of an upper panel 14a and the lower panel 14b, and includes a door area 28 located in the vicinity of the opening 18a of the case 17, and a cover portion 27 located around the door area 28 for covering rearward of the panel portion 23. The door area 28 includes a pair of doors 35, and each one upper, lower, left and right side wall 29, 30, 31, and 32 that are located in a periphery of the doors 35.

The pair of doors 35 is formed into a generally rectangular plate shape slightly larger than the opening 18a of the housing 17, and covers the opening 18a. The doors 35 open in the vertical direction. Each of the doors 35 is provided at the upper or lower end with a hinge line 34 for the door to open around, and is provided, in a generally H-shaped portion in a circumference thereof as viewed from rearward, with a thinned breakable portion 33.

The upper side wall 29, the lower side wall 30, the left side wall 31 and the right side wall 32 protrude forward to neighbor the circumferential wall portion 19 of the housing main body 18 from outside. In the illustrated embodiment, the upper side wall 29 located close to the upper wall 19a of the circumferential wall portion 19 and the lower side wall 30 located close to the lower wall 19b serve as joint walls for attaching the airbag cover 26 to the housing 17. Each of the upper wall 29 and the lower wall 30 is provided with retaining holes 29a or 30a for retaining the retaining pawls 20.

Referring to FIGS. 2 and 3, the inflator 37 is formed into a cylindrical shape which locates its axial direction along the vehicle's transverse direction. The inflator 37 includes a generally columnar body 38 and a diffuser 39. The inflator body 38 is provided at its one end (in a left end, in the illustrated embodiment) with a plurality of gas discharge ports 38a. The other end, or right end, is connected with a connector 41 from which a lead wire 42 for inputting actuating signals extends. The diffuser 39 includes a generally tubular holding tube 39a of sheet metal covering the inflator body 38, and a plurality of (two, in the illustrated embodiment) bolts 39c protruded from the holding tube 39a. The holding tube 39a is provided in its rear side face as mounted on the vehicle with a plurality of gas outlet ports 39b for emitting inflation gas discharged from the gas discharge ports 38a.

The inflator 37 is actuated by an actuating signal inputted through the lead wire 42 when an airbag actuating circuit mounted on the vehicle detects a frontal collision of the vehicle. At this time, an unillustrated airbag device mounted on the steering wheel 8 is actuated simultaneously.

Referring to FIGS. 5 to 9, the airbag 44 is formed of flexible woven fabric of polyester, polyamide or the like, and includes an airbag body 45 and two tethers 54 and 55 located inside the airbag body 45 for regulating a thickness of the airbag body 45 completely inflated.

Figure 5:
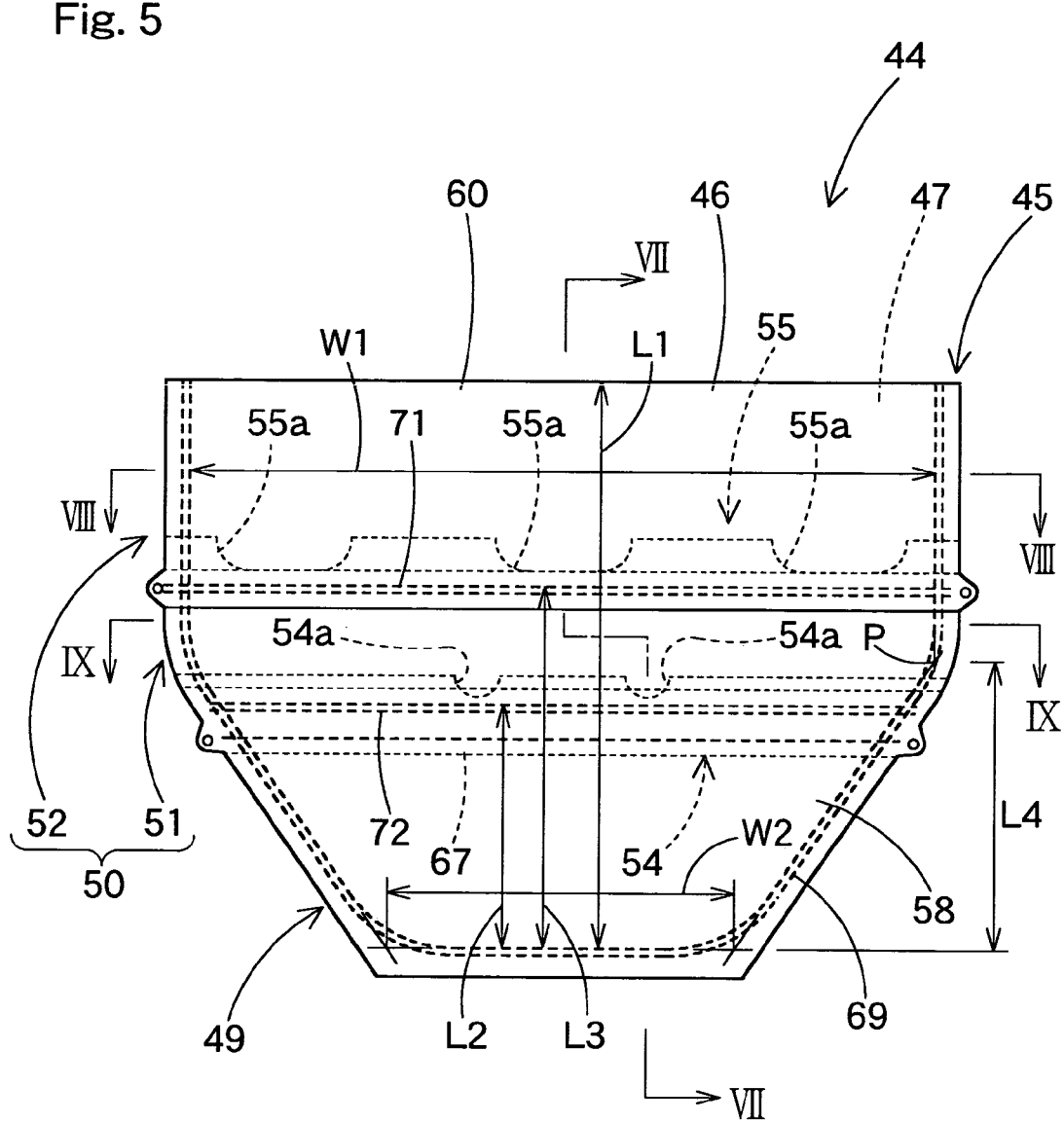
FIG. 5 is a front view of an airbag used in the airbag device of FIG. 1.
Figure 6:
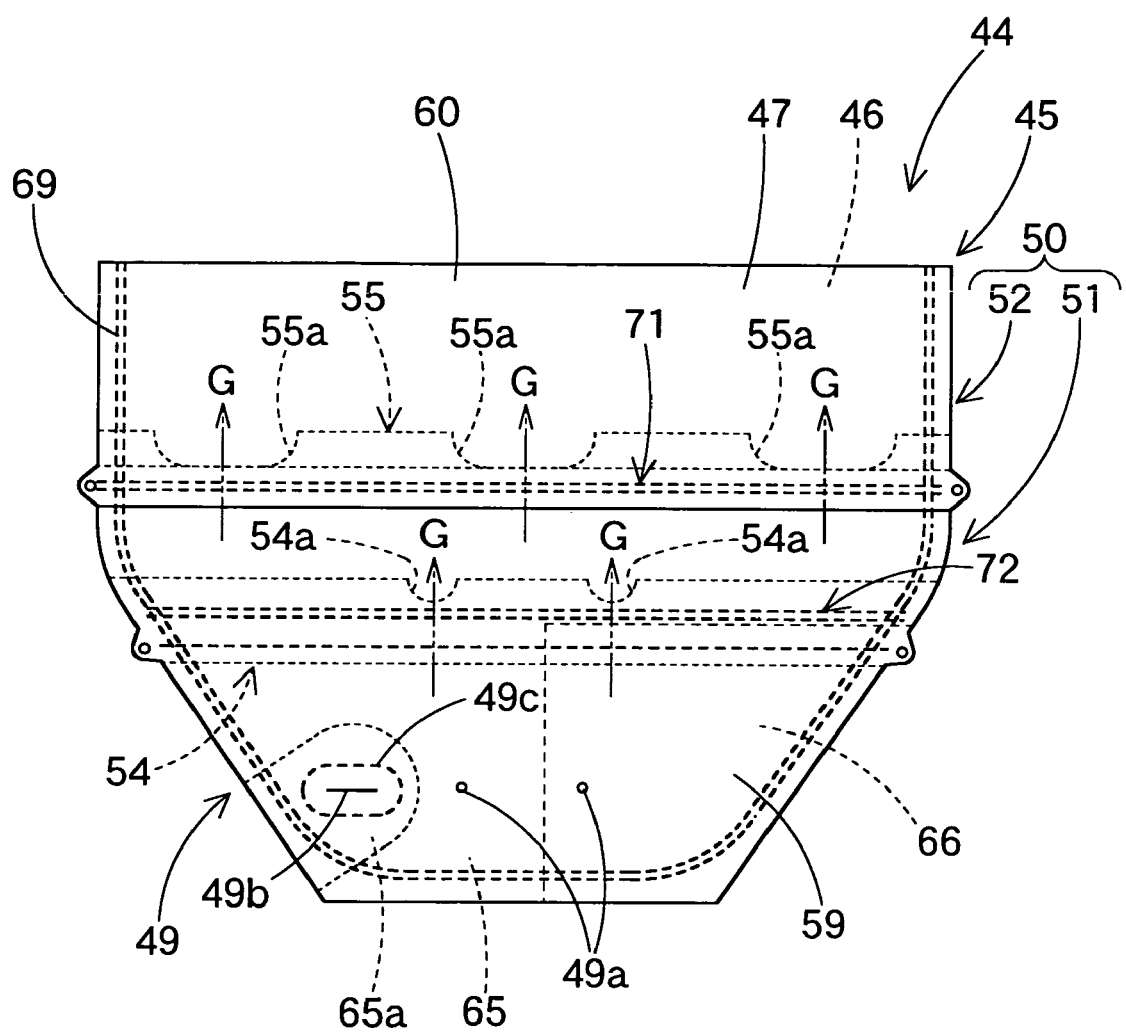
FIG. 6 is a rear view of the airbag of FIG. 5.
Figure 7:
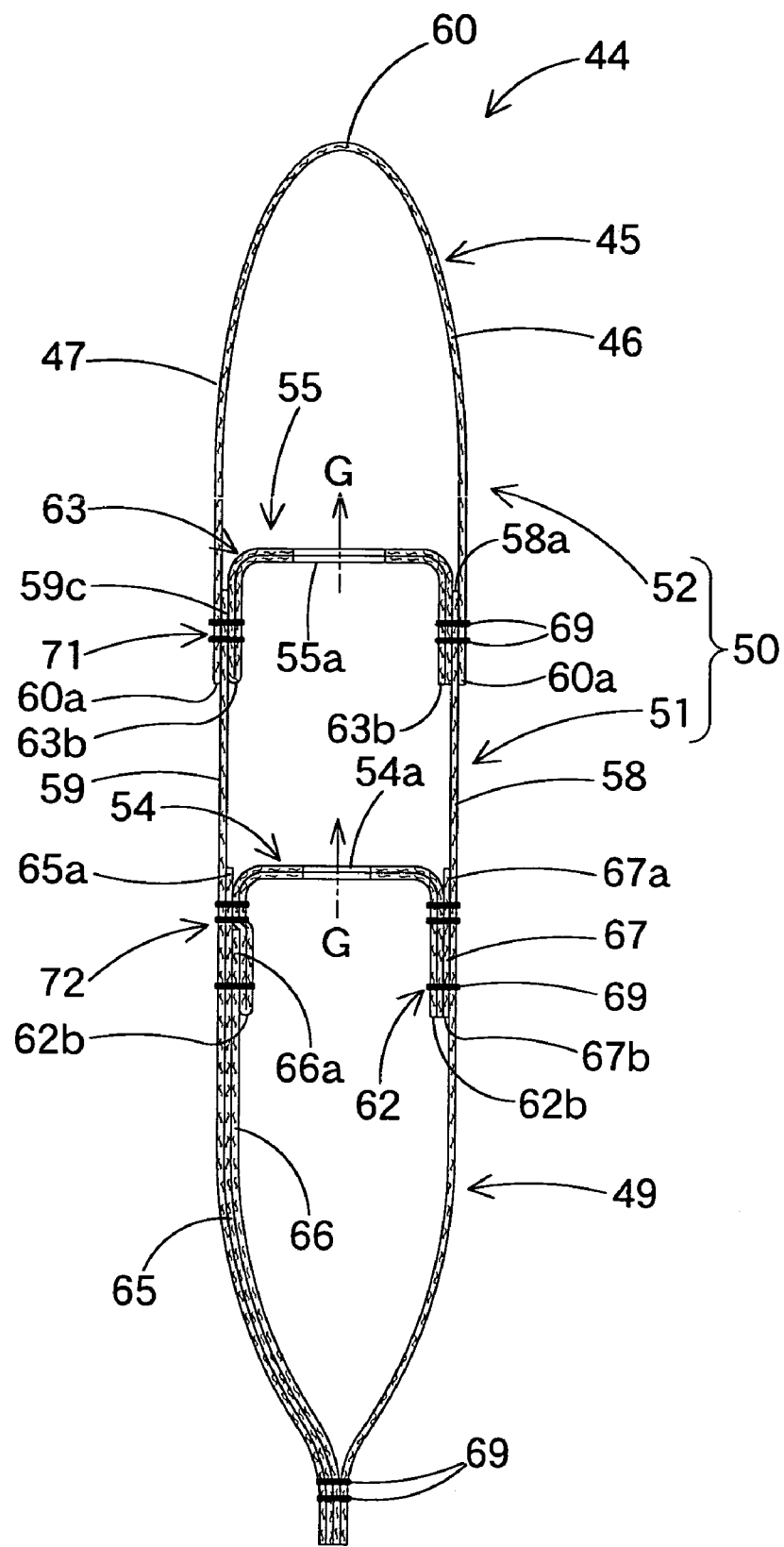
FIG. 7 is a schematic enlarged section taken along line VII-VII in FIG. 5.

The airbag body 45 is formed into a generally rectangular plate shape when deployed completely, as shown in FIGS. 5 and 6, and includes an upstream part 49 which is located toward a lower end of the airbag body 45 as completely inflated, and a downstream part 50 which is located toward an upper end of the airbag body 45 as completely inflated. The upstream part 49 is located upstream, while the downstream part 50 is located downstream, in a stream of inflation gas. The downstream part 50 is adapted to protect an area from shins L to knees K of the driver MD as an occupant, when the airbag 44 is completely inflated, and has a lateral width capable of protecting the knees KL and KR of the driver MD (refer to FIG. 4). The airbag body 45 is a plane airbag constructed of an occupant side wall 46 deployed toward the occupant MD, and a vehicle body side wall 47 deployed toward the column cover 13, each upon airbag deployment. Each of the walls 46 and 47 has generally the same outer contour like a combination of a rectangle and a trapezoid.

Figure 11:
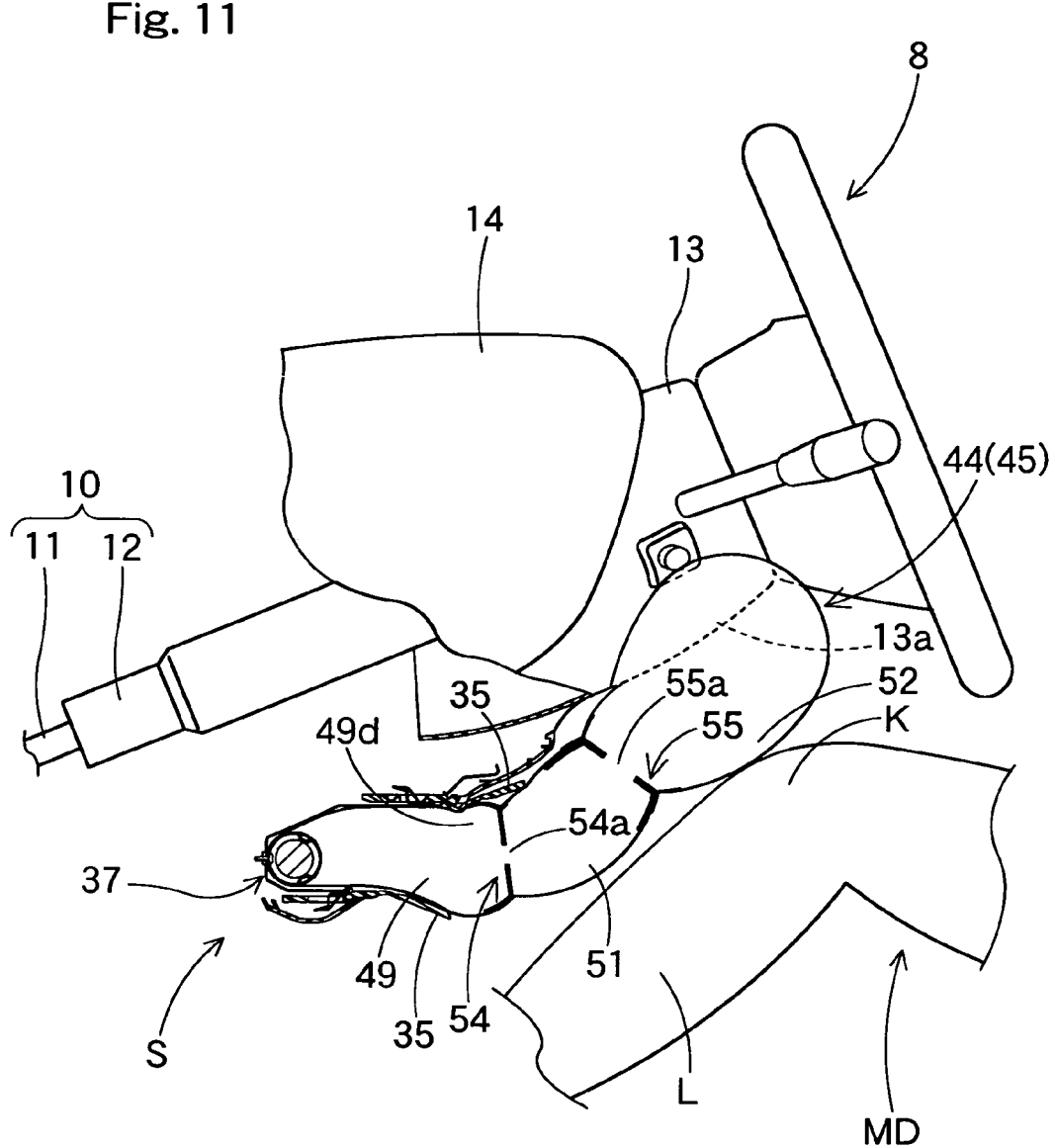
FIG. 11 is a schematic section of the airbag device of FIG. 1, in a state that the airbag is completely inflated.

The upstream part 49 is held by the housing body 18 by means of the inflator 37, and its major part remains inside the housing body 18 when the airbag 44 is completely deployed. As shown in FIGS. 3 and 6, there are two insert holes 49a and a slit 49b in a lower part of the vehicle body side wall 47 in the upstream part 49. The insert holes 49a are for inserting the individual bolts 39c of the inflator 37 therethrough, whereas the slit 49b is for inserting the inflator body 38 therethrough. The airbag 44 is attached to the housing body 18 by that peripheries of the individual insert holes 49a are clamped between the holding tube 39a and the bottom wall 21 of the housing body 18 while the inflator body 38 is protruded from the slit 49b. As shown in FIG. 11, an upper part 49d of the upstream part 49 protruded from the housing body 18 upon airbag deployment does not contact with legs or shins L of the occupant MD.

The downstream part 50 protrudes, upon airbag inflation, rearward from the housing opening 18a, and is deployed between the occupant MD and the column cover 13 to protect an area from shins L to knees K of the occupant MD. The downstream part 50 includes a shin-protecting area 51 located immediately above the upstream part 49 for protecting shins L of the occupant MD, and a knee-protecting area 52 located above the shin-protecting area 51 or in upper end part of the airbag body 45 for protecting knees K of the occupant MD. In the illustrated embodiment, the shin-protecting area 51 and the knee-protecting area 52 are partitioned by a tether (or partitioning tether) 55. Incidentally, the shin-protecting area 51 and the upstream part 49 are partitioned by a tether (regulating tether) 54.

The tethers 54 and 55 are adapted to control the thickness of the airbag body 45 upon airbag inflation by joining the occupant side wall 46 and the vehicle body side wall 47 of the airbag body 45, and are arranged one above the other. As shown in FIGS. 6 to 9, each of the tethers 54 and 55 is sewn to all over inner circumference of the airbag body 45, and thus joined to the airbag body 45, along the transverse direction, in such a manner as to partition an inner space of the airbag body 45 in vertical direction. Each of the tethers 54 and 55 has a band shape, or a generally rectangular plate shape, elongated in transverse direction.

The tether 54 serves as a regulating tether to partition the upstream part 49 and the shin-protecting area 51. The tether 54 is provided with gas communication holes 54a each serving as gas flow path that supply inflation gas G, which has flown into the upstream part 49, to the shin-protecting area 51. In the illustrated embodiment, the gas communication holes 54a, each having a generally circular shape, are located in two positions along transverse orientation in the vicinity of transverse center of the tether 54. A total of opening areas A1, or a sectional area of flow path, of the gas communication holes 54a (refer to FIG. 9) is predetermined such that, upon deployment of the airbag 44, there arises a time lag between a peak time of internal pressure of the shin-protecting area 51 and a peak time of internal pressure of the upstream part 49. More specifically, the total of opening areas A1 of the gas communication holes 54a is so predetermined that an internal pressure of the shin-protecting area 51 peaks 5 to 15 ms (more desirably, 6 to 10 ms) later than the peak time of internal pressure of the upstream part 49. If the time lag between the peak times of internal pressures of the shin-protecting area 51 and the upstream part 49 is less than 5 ms, the time lag is so small that the inflating shin-protecting area 51 may press shins L of an occupant MD. On the contrary, the time lag surpassing 15 ms may delay inflation of the downstream part 50, and hinder the knee-protecting area 52 from securing enough internal pressure, so that knees K of the occupant MD may not be protected properly.

The tether 55 serves as a partitioning tether to partition the shin-protecting area 51 and the knee-protecting area 52 in a region of the downstream part 50. The tether 55 is provided with gas communication holes 55a each serving as gas flow path that supply inflation gas G, which has flown into the shin-protecting area 51, to the knee-protecting area 52. In the illustrated embodiment, the gas communication holes 55a, each having a generally oval shape, are located in three positions along transverse orientation. As viewed from above, one of the holes 55a is located between the gas communication holes 54a provided in the tether 54, and each of remaining two holes 55a is located in left and right side of each of the gas communication holes 54a (refer to FIG. 8). In other words, the gas communication holes 54a of the tether 54 and the gas communication holes 55a of the tether 55 are arranged in such a manner as dislocated from one another in transverse direction, as viewed from above. A total of opening areas A2, or a sectional area of flow path, of the gas communication holes 55a (refer to FIG. 8) is predetermined greater than the total of opening areas A1 of the gas communication holes 54a in the tether 54. More specifically, a ratio of the total of opening areas A1 of the gas communication holes 54a to the total of opening areas A2 of the gas communication holes 55a is predetermined within a range of 0.1 to 0.4 (more desirably, 0.2 to 0.3).

In the foregoing embodiment, a capacity of the airbag body 45 is set for 15 to 20 liter, whereas an output of the inflator body 38 is set for 200 to 250 kPa/ft$^3$ (5.66 to 7.08 kPa/m$^3$). A capacity of the upstream part 49 is set for 5 to 8 liter, whereas a capacity of the downstream part 50 is set for 10 to 14 liter. A capacity of the shin-protecting area 51 is set for 3 to 6 liter, whereas a capacity of the knee-protecting area 52 is set for 7 to 10 liter. The total of opening areas A1 of the gas communication holes 54a in the tether 54 is set for 15 to 25 cm$^2$, whereas the total of opening areas A2 of the gas communication holes 55a in the tether 55 is set for 60 to 100 cm$^2$. It is desired in the knee-protecting airbag device S that the airbag 44 completes inflation in a shorter time period than 30 ms, which is an usual time period from actuation of the inflator body 38 to contact of advancing knees K of occupant MD against a completely inflated airbag 44. Accordingly, the internal pressure of the knee-protecting area 52 is set to peak 22 to 26 ms after actuation of the inflator body 38.

Moreover, as shown in FIG. 5, a vertical length L1 of the airbag body 45 is set for 450 to 470 mm, a distance L2 from a lower edge of the upstream part 49 to the regulating tether 54 is set for 170 to 200 mm, and a distance L3 from the lower edge of the upstream part 49 to the partitioning tether 55 is set for 260 to 300 mm. In addition, a distance L4 between the lower edge of the upstream part 49 and an intersection P of an oblique side being an edge of the upstream part 49 and an edge of the downstream part 50 (or the knee-protecting area 52) is set for 215 to 235 mm. A transverse width W1 of the knee-protecting area 52 is set for 550 to 600 mm, whereas a transverse width W2 of lower edge part of the upstream part 49 is set for 275 to 305 mm. In the meantime, a width W3 of the regulating tether 54 is set for 50 to 60 mm, whereas a width W4 of the partitioning tether 55 is set for 50 to 80 mm, as shown in FIG. 10.

Figure 10:
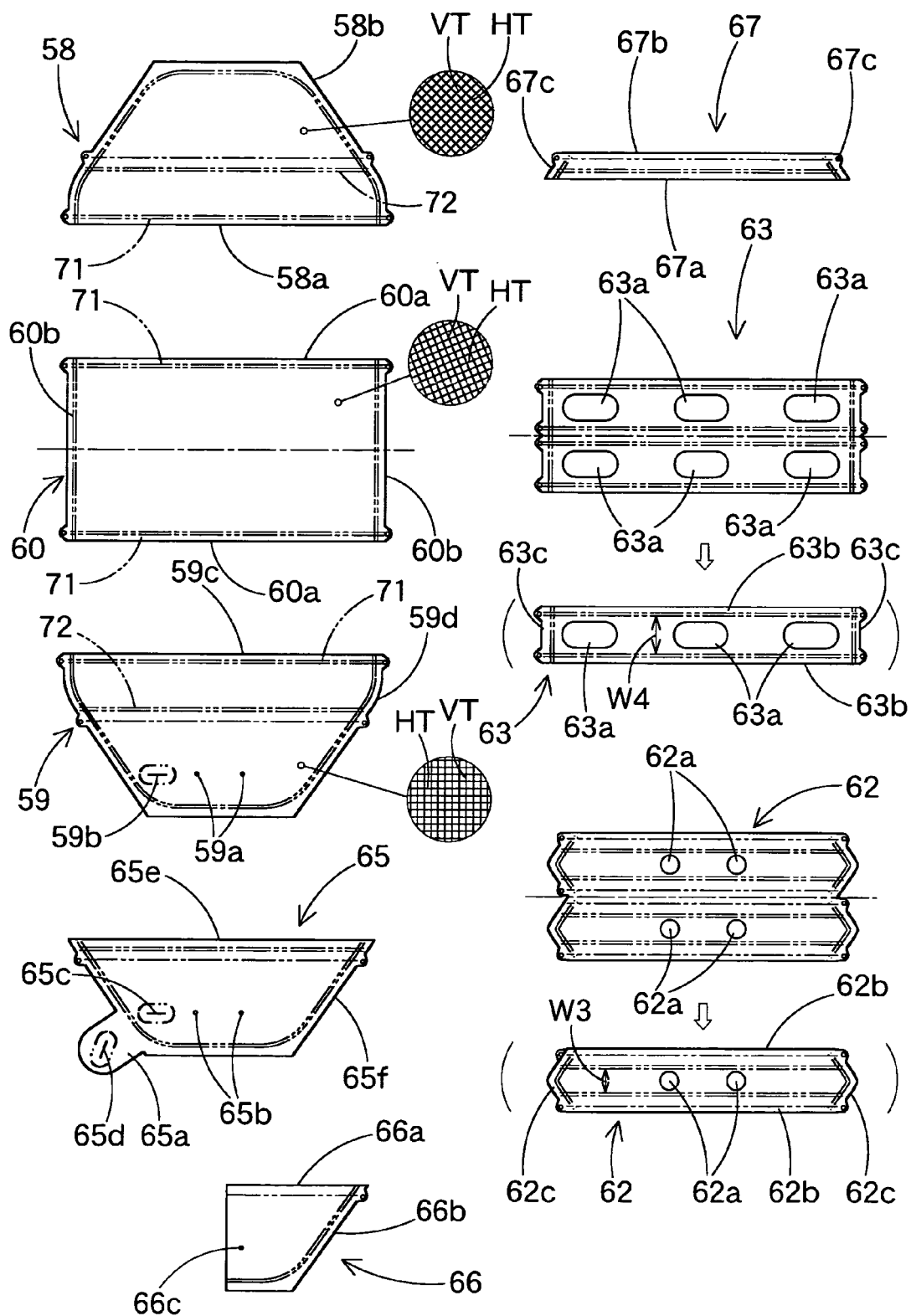
FIG. 10 shows developments of base cloths for forming the airbag of FIG. 5.

In the illustrated embodiment, the airbag 44 is formed by sewing up three bag body base cloths 58, 59 and 60, two tether base cloths 62 and 63, and three reinforcing cloths 65, 66 and 67 with sewing yarn 69, as shown in FIG. 10. In the foregoing embodiment, the bag body base cloths 58, 59 and 60, and the reinforcing cloth 66 is made of fabric coated by coating agent such as silicone, whereas the tether base cloths 62 and 63 and remaining reinforcing cloths 65 and 67 are made of fabric not coated by coating agent.

The bag body base cloths 58 and 59 are to constitute the upstream part 49 and the shin-protecting area 51 of the downstream part 50, and have generally the same trapezoidal contour. The base cloth 58 is to constitute the occupant side wall 46 in the upstream part 49 and the shin-protecting area 51. Cutting of the base cloth 58 is made such that its warps VT and wefts HT intersect with vertical direction at an angle of 45°, respectively. The base cloth 59 is to constitute the vehicle body side wall 47 in the upstream part 49 and the shin-protecting area 51, and is provided with openings 59a and a slit 59b which are to serve as the insert holes 49a and the slit 49b, respectively. Cutting of the base cloth 59 is made such that its warps VT extend generally along vertical direction, whereas its wefts HT intersect with vertical direction at 90°. The base cloth 60 constitutes the occupant side wall 46 and the vehicle body side wall 47 in the knee-protecting area 52 of the downstream part 50, and has a generally rectangular shape. Cutting of the base cloth 60 is made such that its yarn direction intersects with yarn directions of each of the base cloths 58 and 59. Specifically, warps VT of the base cloth 60 intersect with vertical direction at an angle of 22.5°.

The tether base cloth 62 is to constitute the regulating tether 54, and has a generally rectangular shape. The base cloth 62 is folded into two in the center vicinity of its width direction, on a fold extending along its longitudinal direction, and then sewn to the bag body base cloths 58 and 59 at edges in the twofold state, thereby forming the tether 54. The base cloth 62 is provided with four corresponding openings 62a to form the gas communication holes 54a. Each of the openings 62a has a generally circular shape.

The tether base cloth 63 is to constitute the partitioning tether 55, and has a generally rectangular shape. As the base cloth 62, the base cloth 63 is folded into two in the center vicinity of its width direction, on a fold extending along its longitudinal direction, and then sewn to the bag body base cloths 58, 59 and 60 at edges in the twofold state, thereby forming the tether 55. The base cloth 63 is provided with six corresponding openings 63a to form the gas communication holes 55a. Each of the openings 63a has a generally oval shape.

The reinforcing cloth 65 is to be arranged in inner side of lower part of the bag body base cloth 59, and is formed into a generally trapezoidal shape. The reinforcing cloth 65 is provided with openings 65b and a slit 65c each to constitute the insert holes 49a and the slit 49b. The cloth 65 also includes a projection 65a for reinforcing periphery of the slit 49b. The projection 65a is also provided with a slit 65d to constitute the slit 49b.

The reinforcing cloth 66 is to be arranged in inner side of the reinforcing cloth 65, to cover a leading end part of, or a left half portion when mounted on vehicle, of, the inflator 37. The reinforcing cloth 66 is made of heat-resistant coated fabric so as to reduce damages caused by heat of inflation gas discharged from the gas discharge ports 38a of the inflator 37. The cloth 66 is provided with an opening 66c to constitute the insert hole 49a. The reinforcing cloth 67 is adapted to reinforce a joint of the tether 54 and the occupant side wall 46, and is formed into a band shape extending along transverse direction.

To manufacture the airbag 44, the tether base cloth 63 is firstly folded back on a fold extending along its longitudinal direction, in the center vicinity of its width direction. Then edges in the width direction, or lower edges 60a and 60b of the bag body base cloth 60 are sewn to upper edges 58a and 59c of the bag body base cloths 58 and 59, respectively, with sewing yarn 69. Concurrently, the tether base cloth 63 in a twofold state is arranged in inner sides of the bag body base cloths 58 and 59, and then sewn to the base cloths 58 and 59 at edges 63b in the width direction. The lower edges 60a and 60b of the bag body base cloth 60 are disposed outsides of the upper edges 58a and 59c of the bag body base cloths 58 and 59, when the cloth 60 is sewn to the cloths 58 and 59.

Thereafter, the reinforcing cloth 67 and the tether base cloth 62, which has been folded back on a fold extending along its longitudinal direction in the center vicinity of its width direction, are arranged in inner side of the body base cloth 58, and an upper edge 67a of the reinforcing cloth 67 is sewn to the base cloth 58 with sewing yarn 69, together with the tether base cloth 62. Subsequently, a lower edge 67b of the reinforcing cloth 67 is sewn to the base cloth 58 together with one edge 62b of the tether base cloth 62 in the width direction. In the meantime, the reinforcing cloth 65 is arranged in inner side of the bag body base cloth 59, and an upper edge 65e of the reinforcing cloth 65 is sewn to the base cloth 59 with sewing yarn 69, together with the tether base cloth 62. Subsequently, the reinforcing cloth 66 is so located that its upper edge 66a is disposed between the reinforcing cloth 65 and the tether base cloth 62, and another edge 62b of the tether base cloth 62 in the width direction is sewn to the bag body base cloth 59 with sewing yarn 69, together with the upper edge 66a of the reinforcing cloth 66 and the reinforcing cloth 65.

Thereafter, the projection 65a of the reinforcing cloth 65 is folded back inward, and an area around the slit 49b in the bag body base cloth 59, the reinforcing cloth 65 and the projection 65a, which are overlapped, is stitched up in a generally oval shape, thereby providing a reinforced area 49c. Thereafter, edges 60b in the longitudinal direction of the bag body base cloth 60, and remaining edges 58b and 59d of the base cloths 58 and 59 are sewn up with sewing yarn 69 together with edges 62b, 63b, 67c in the longitudinal direction of the tether base cloths 62, 63, and the reinforcing cloth 67, and remaining edges 65f and 66b of the reinforcing cloths 65 and 66, and thus the airbag 44 is completed. Incidentally, the openings 59a, 65b, 66a and the slits 59b, 65c and 65d to constitute the insert holes 49a and the slit 49b may be formed in the respective base cloths 59, 65 and 66 in advance. Alternatively, those openings may be formed by punching work or the like at a time, after joining the reinforcing cloths 65 and 66 to the bag body base cloth 59.

Now described is how to mount the knee-protecting airbag device S according to an embodiment of the present invention on the vehicle. Firstly, the inflator 37 is housed within the airbag 44 with the bolts 39c projected from the insert holes 49a and the end of the inflator body 38 projected from the slit 49b. Then the airbag 44 is folded up, and an unillustrated breakable wrapping member is wrapped around the folded-up airbag 44 for keeping the folded-up configuration. At this time, the bolts 39c of the inflator 37 and the end of the inflator body 38 protruded from the insert holes 49a and the slit 49b are taken out from the wrapping member.

Subsequently, the inflator 37 is housed in the housing body 18 together with the folded-up airbag 44 so that the individual bolts 39c of the inflator 37 are protruded from the insert holes 21a and nuts 40 fixed while the end of the inflator body 38 is protruded from the insert hole 19d.

Thereafter, the airbag cover 26 is attached to the housing 17. More specifically, the upper side wall 29 is inserted into the slit 23a of the panel portion 23, and the airbag cover 26 is moved toward the housing 17. Then the individual retaining pawls 20 are so inserted into the retaining holes 29a and 30a of the upper side wall 29 and the lower side wall 30 as to be retained by peripheries of the retaining holes 29a and 30a. Thus the airbag cover 26 is attached to the housing 17.

Thereafter, the individual joint portions 24 of the housing 17 are secured to the vehicle body 1 utilizing the brackets 4, 5, 6 and 7, whereas the connector 41 having the lead wire 42 joined thereto is connected to the inflator body 38. If the dashboard 14 and an under cover 12, as shown in FIGS. 1 and 2, are then attached, the airbag device S is mounted on the vehicle.

After the airbag device S is mounted on the vehicle, if an actuating signal is inputted to the inflator body 38 via the lead wire 42, inflation gas is discharged from the gas discharge ports 38a of the inflator 37, and the gas then flows into the airbag 44 via the gas outlet ports 39b of the diffuser 39. Then the airbag 44 inflates and breaks the wrapping member, pushes the doors 35 of the airbag cover 26, and breaks the breakable portion 33 to open the doors 35 vertically around the hinge lines 34, and thus the airbag 44 deploys as indicated by double-dotted lines in FIGS. 1 and 4, and solid lines in FIG. 11.

In the knee-protecting airbag device S according to the present invention, upon airbag inflation, internal pressure of the shin-protecting area 51, which is adapted to protect shins L of an occupant MD when completely inflated, peaks 5 to 15 ms later than the peak time of internal pressure of the upstream part 49. This means that the internal pressure in the downstream part 50 rises gradually in the course of inflation. Accordingly, even when the airbag 44 inflates in a condition that legs (especially, shins L) of the occupant MD are located proximate to the column cover 13, the shin-protecting area 51 of the downstream part 50 does not press the shins L unduly during inflation, so that the shins L of the occupant MD are protected softly. If the time lag between the peak times of internal pressures of the shin-protecting area 51 and the upstream part 49 is less than 5 ms, the time lag is so small that the inflating shin-protecting area 51 may press shins L of the occupant MD. On the contrary, the time lag surpassing 15 ms may delay inflation of the downstream part 50, and hinder the knee-protecting area 52 from securing enough internal pressure, so that knees K of the occupant MD may not be protected properly.

Figure 12A:
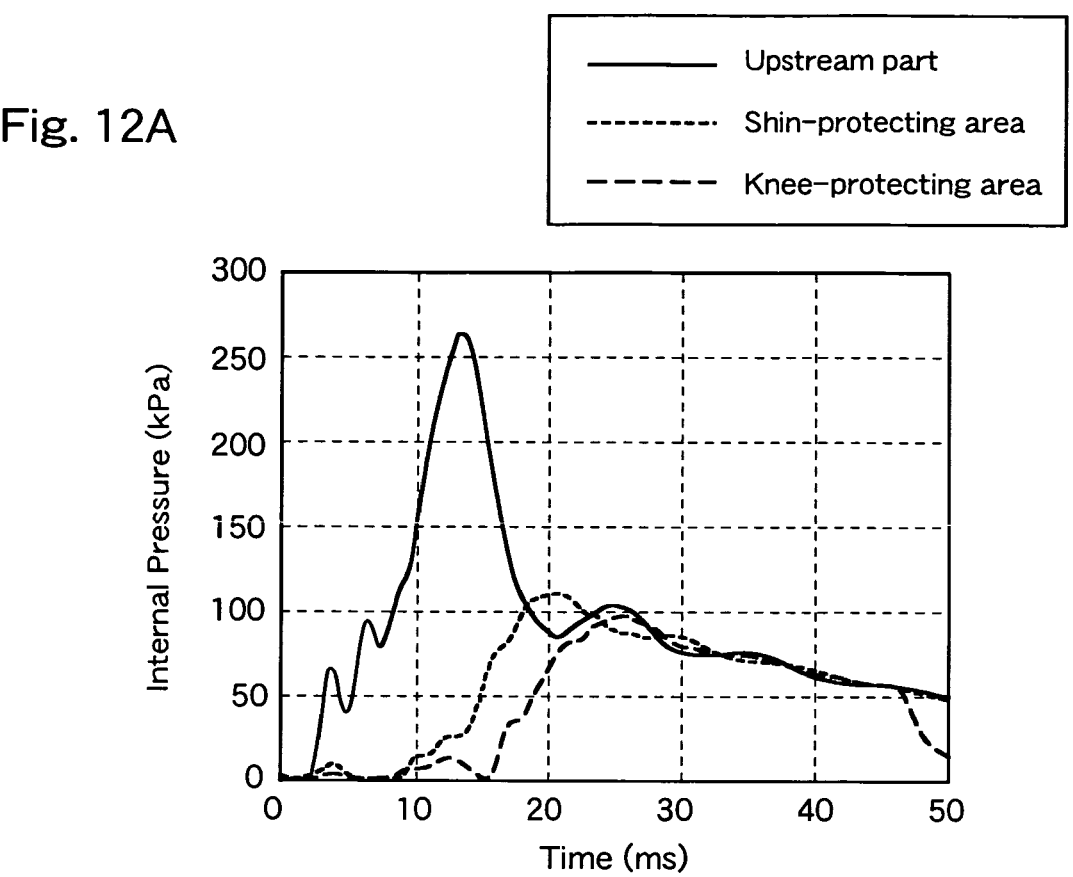
FIG. 12A is a graph showing internal pressure of the airbag in the course of inflation, in the airbag device of the present invention.

FIG. 12A shows a graph of measurements of internal pressure of the airbag 44 used in the knee-protecting airbag device S of the foregoing embodiment, in inflation. In the airbag 44 used for measurement of internal pressure, each length L1-L4 of individual part is set for: L1: 470 mm, L2: 200 mm, L3: 300 mm, and L4: 235 mm. Each width W1-W4 of individual part is set for: W1: 600 mm, W2: 305 mm, W3: 50 mm, and W4: 80 mm. Moreover, the capacity of the airbag body 45 is set for 18 liter (the downstream part 50: 13 liter, the shin-protecting area 51: 3 liter, and the knee-protecting area 52: 10 liter), whereas a total of opening areas A1 of the gas communication holes 54*a* in the regulating tether 54 is set for 19.2 cm$^2$, and a total of opening areas A2 of the gas communication holes 55*a* in the partitioning tether 55 is set for 93.2 cm$^2$.

This graph shows that internal pressure of the upstream part 49 rises steeply at first when inflation gas is discharged from the inflator 37 in the airbag 44 of the airbag device S according to the foregoing embodiment. When the internal pressure of the upstream part 49 peaks at around 13 ms, internal pressure of the shin-protecting area 51 is in a gradual rise. Internal pressure of the shin-protecting area 51 peaks at around 21 ms when the internal pressure of the upstream part 49 turns to steep decline, and about 8 ms passed from peak time of the internal pressure of the upstream part 49, and then the internal pressure of the knee-protecting area 52 peaks at around 25 ms. Therefore, even when the airbag 44 inflates in a condition that legs (especially, shins L) of the occupant MD are located proximate to the column cover 13, the shin-protecting area 51 of the downstream part 50 does not press the shins L unduly during inflation, so that the shins L of the occupant MD are protected softly. In the airbag device S of the foregoing embodiment, although the internal pressure of the upstream part 49 rises steeply in the initial stage of inflation, major part of the upstream part 49 remains inside the housing body 18 when the airbag 44 is completely inflated, as shown in FIG. 11. Moreover, an upper part 49*d* of the upstream part 49 protruded from the housing body 18 does not contact with legs of the occupant MD, also as shown in FIG. 11. Therefore, the shins L of the occupant MD are smoothly protected even if the internal pressure of the upstream part 49 rises.

Figure 8:
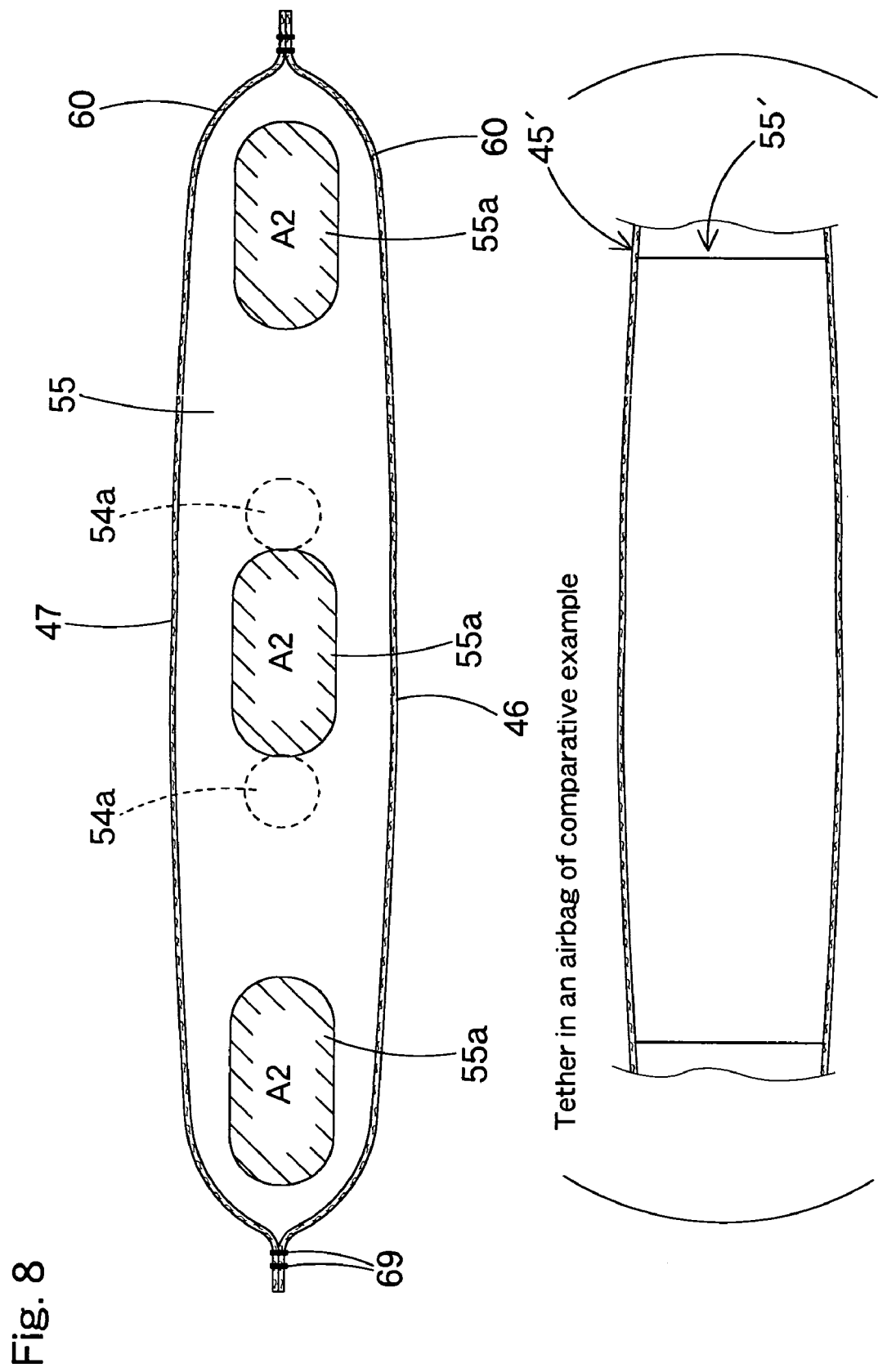
FIG. 8 is a schematic enlarged section taken along line VIII-VIII in FIG. 5.
Figure 9:
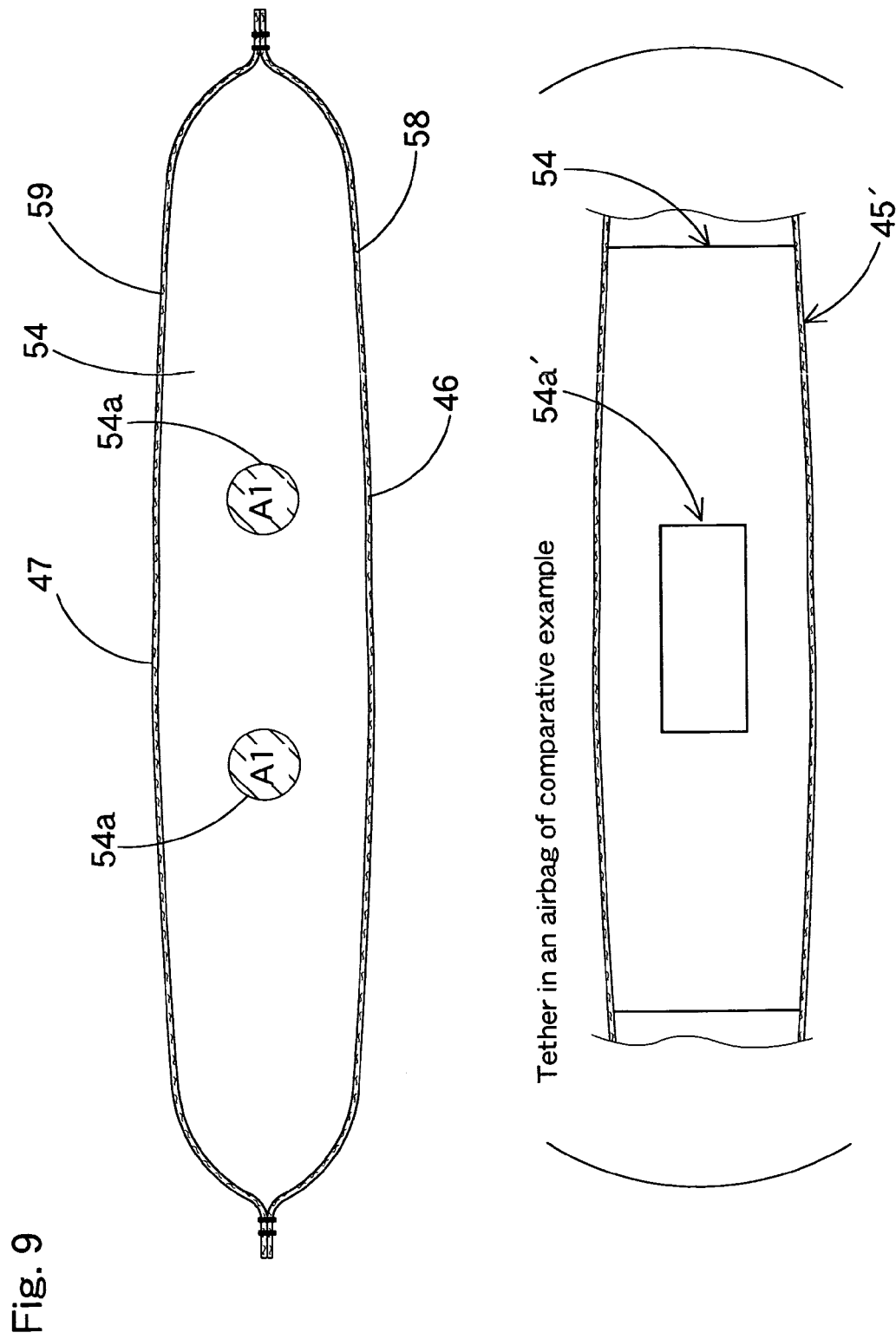
FIG. 9 is a schematic enlarged section taken along line IX-IX in FIG. 5.
Figure 12B:
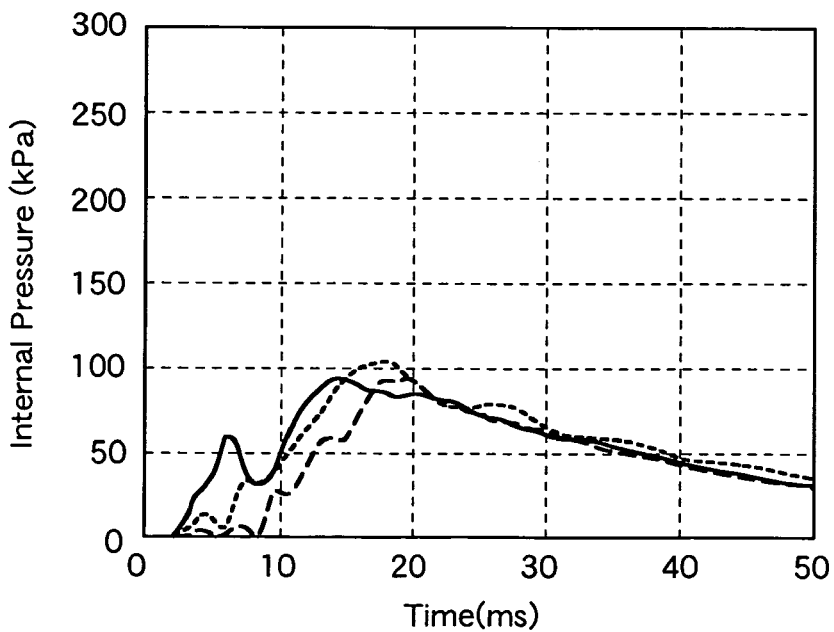
FIG. 12B is a graph showing internal pressure of an airbag of a comparative example.

In comparison with this, FIG. 12B shows measurement results of internal pressure of a comparative example. An airbag body 45' used as a comparative example is set to have the same capacity as the airbag body 45 in the airbag 44. As shown in FIGS. 8 and 9, the airbag body 45' is provided with a regulating tether 54' and a partitioning tether 55' disposed one above the other. Each of the tethers 54' and 55' is arranged in such a manner as to leave a gap between itself and left or right edge of the airbag body 45', and the regulating tether 54' disposed in lower side is provided, in its center vicinity, with a gas communication hole 54*a*' for sending inflation gas toward a shin-protecting area from a upstream part. In this comparative example, as shown in FIG. 12B, as the internal pressure of the upstream part rises, the internal pressure of the shin-protecting area also rises steeply. Then, right after the internal pressure of the upstream part peaks at around 14 ms, the internal pressure of the shin-protecting area peaks at around 17 ms. In such an airbag as this comparative example, there is too little time lag between the peak times of internal pressures of the upstream part and the shin-protecting area. This may cause the shin-protecting area to press occupant's shins unduly during inflation, which is not favorable.

In the knee-protecting airbag device S according to the present invention, therefore, shins L of an occupant MD are protected softly even if legs of the occupant MD are located proximate to vehicle body.

In the airbag device S, the time lag between the peak times of internal pressures of the upstream part 49 and the shin-protecting area 51 is caused by the opening area A1 (or sectional area of flow path) of the gas communication holes 54*a* that are formed in the regulating tether 54 located between the upstream part 49 and the downstream part 50. This construction is easily made merely by a design change of a tether of airbag which has been conventionally used in a knee-protecting airbag device, which contributes to reduce manufacturing cost and number of parts. Without considering this point, the time lag between the peak times of internal pressures of the upstream part and the shin-protecting area may be adjusted by, for example, adjusting output of inflator which discharges inflation gas.

In the airbag device S, moreover, the regulating tether 54 is joined to all over inner circumference of the airbag body 45, and includes the gas communication holes 54*a* through which inflation gas passes. That is, the upstream part 49 and the shin-protecting area 51 is partitioned by the regulating tether 54, and inflation gas G fed to the upstream part 49 then flows into the shin-protecting area 51 in the downstream part 50 via the communication holes 54*a* in the regulating tether 54. Accordingly, in the initial stage of airbag inflation, inflation gas G comes to enter into the shin-protecting area 51 in a phase the upstream part 49 has completed inflation partway, and thus the peak time of internal pressure of the shin-protecting area 51 is securely delayed than the peak time of internal pressure of the upstream part 49. In addition, in the airbag device S, the upstream part 49 expands widely in transverse direction in the initial stage of airbag inflation. Accordingly, expansion of the downstream part 50 thereafter goes smoothly.

In the airbag device S, moreover, since the downstream part 50 includes the partitioning tether 55 partitioning the shin-protecting area 51 and the knee-protecting area 52, thickness of the downstream part 50 during airbag inflation is controlled by the partitioning tether 55, and the shin-protecting area 51 is prevented from inflating thickly in such a manner as to press shins L of an occupant MD. In addition, since the total of opening areas A1 of the gas communication holes 54*a* in the regulating tether 54 is set smaller than the total of opening areas A2 of the gas communication holes 55*a* in the partitioning tether 55, the peak time of internal pressure of the shin-protecting area 51 is securely delayed.

Furthermore, in the airbag device S of the foregoing embodiment, the regulating tether 54 and the partitioning tether 55 are respectively joined to all over inner circumference of the airbag body 45, and include the gas communication holes 54*a*/55*a* through which inflation gas passes. That is, flow path of inflation gas is constituted by the gas communication holes 54*a* and 55*a* formed in the tethers 54 and 55. With this construction, sectional area of gas flow path can be adjusted by merely changing opening area of each of the gas communication holes 54*a* and 55*a*, and setting of the sectional area of flow path is facilitated in comparison with a case in which, for example, a tether is joined to part of an airbag body, not to all over inner circumference thereof, such that a gas flow path is provided between a base cloth forming the airbag body and the tether.

Figure 13:
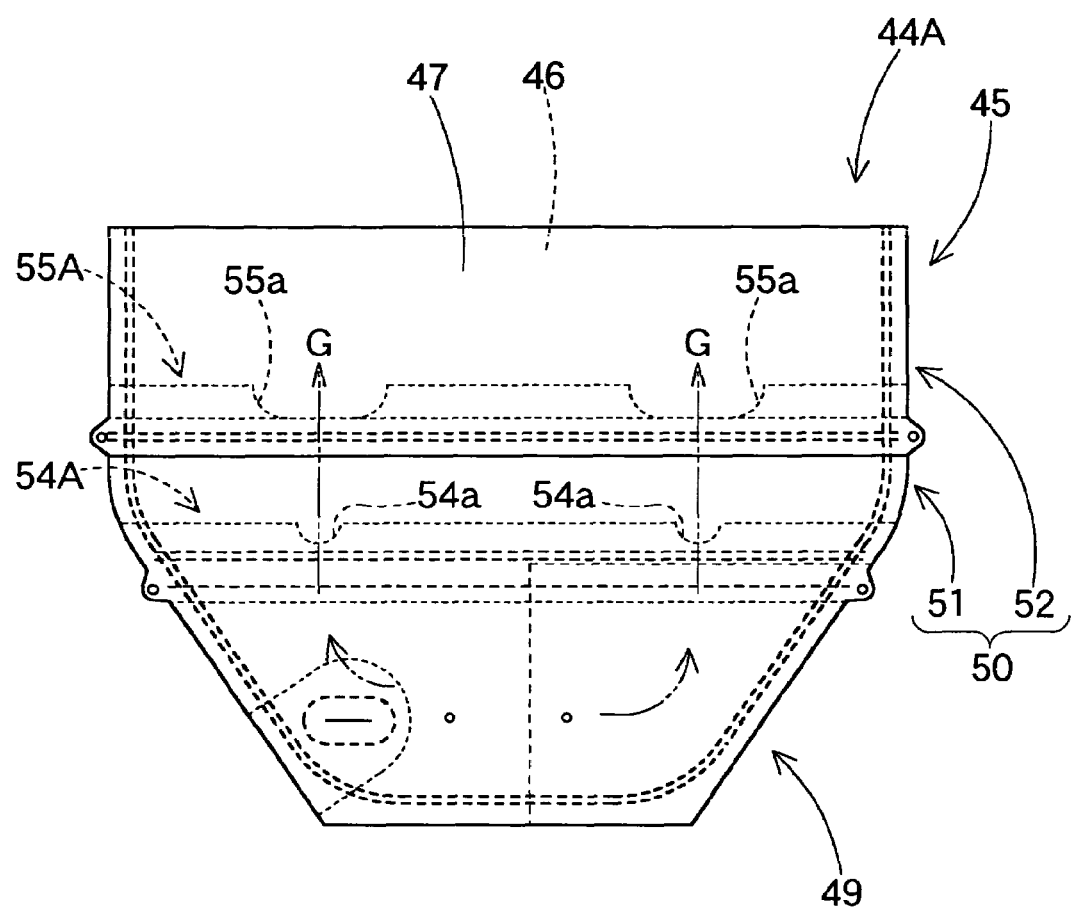
FIG. 13 is a front view of an airbag according to another embodiment of the present invention.

It will also be appreciated to employ an airbag in which each of gas communication holes 54a in a regulating tether 54A and each of gas communication holes 55a in a partitioning tether 55A are arranged in series with each other in vertical direction, as in an airbag 44A shown in FIG. 13. With this airbag 44A, inflation gas G flown into a shin-protecting area 51 from an upstream part 49 via the communication holes 54a directly reaches upper end of a knee-protecting area 52, via the communication holes 55a arranged in series with the communication holes 54a, and therefore, the knee-protecting area 52 inflates swiftly.

Although the airbag body in the foregoing embodiment includes two tethers 54 and 55, the number of tethers should not be limited thereby, but more than one tether may be disposed in an area of the downstream part 50. Besides, although each of the tethers 54 and 55 is used in a twofold state, shape of the tethers should not be limited thereby. For example, a base cloth having such a contour as the tether base cloth 62 or 63 is split up in the vicinity of its fold line (i.e., the same contour as the tether) may be used in two-ply state as the tether.

Although the foregoing embodiment has been described as applied to the knee-protecting airbag device S for driver's seat which is located below the steering column 9 for protecting knees K of a driver MD, the present invention may naturally be applied to a knee-protecting airbag device for front passenger's seat located in front of front passenger's seat for protecting knees of a passenger seated in front passenger's seat.

What is claimed is:

1. A knee-protecting airbag device comprising an airbag, the airbag, when fed with inflation gas, protruding rearward from a housing and deployable upward for protecting occupant's knees, wherein:
the airbag comprises:
an upstream part located toward lower end of the completely inflated airbag and located upstream of inflation gas;
a downstream part located toward upper end of the completely inflated airbag and located downstream of inflation gas, the downstream part protecting an area from shins to knees of the occupant when the airbag is completely inflated;
an airbag body including an occupant side wall located toward the occupant and a vehicle body side wall located toward the vehicle body, respectively when the airbag is completely deployed; and
a regulating tether located within the airbag body, the regulating tether joining the occupant side wall and the vehicle body side wall for regulating thickness of the airbag body as completely inflated, the tether being arranged generally along transverse direction of the airbag body in such a manner as to partition the upstream part and the shin-protecting area; and
a sectional area of flow path of inflation gas flowing toward the shin-protecting area from the upstream part in the regulating tether is controlled, such that there
arises the time lag between peak times of internal pressures of the shin-protecting area and of the upstream part;
wherein:
the downstream part of the airbag comprises a shin-protecting area for protecting occupant's shins; and
in the course of airbag inflation, internal pressure of the shin-protecting area peaks 5 to 15 ms later than a peak time of internal pressure of the upstream part,
wherein:
the airbag comprises more than one tether located within the airbag body and arranged in a row in vertical direction, each of the tethers joining the occupant side wall and the vehicle body side wall for regulating thickness of the airbag body as completely inflated, and each of the tethers extending generally along transverse direction of the airbag body;
one of the tethers is the regulating tether, and one of the rest of the tethers constitutes a partitioning tether for partitioning the shin-protecting area for protecting shins and a knee-protecting area for protecting knees, in the downstream part; and
a sectional area of flow path of inflation gas flowing toward the shin-protecting area from the upstream part in the regulating tether is set smaller than a sectional area of flow path of inflation gas flowing upward in each of locations of the tethers except the regulating tether;
wherein:
each of the regulating tether and the partitioning tether is joined to all over inner circumference of the airbag body, and comprises a gas communication hole allowing the inflation gas to pass therethrough;
wherein:
each of the regulating tether and the partitioning tether comprises more than one gas communication hole disposed side by side along transverse direction; and
the gas communication holes of the regulating tether and the gas communication holes of the partitioning tether are arranged in such a manner as dislocated from one another in transverse direction, as viewed from above.

2. A knee-protecting airbag device comprising an airbag, the airbag, when fed with inflation gas, protruding rearward from a housing and deployable upward for protecting occupant's knees, wherein:
the airbag comprises:
an upstream part located toward a lower end of the completely inflated airbag and located upstream of inflation gas;
a downstream part located toward an upper end of the completely inflated airbag and located downstream of inflation gas, the downstream part protecting an area from shins to knees of the occupant when the airbag is completely inflated, the downstream part of the airbag comprises a shin-protecting area for protecting the occunant's shins;
an airbag body including an occupant side wall located toward the occupant and a vehicle body side wall located toward the vehicle body, respectively when the airbags completely deployed;
a regulating tether located within the airbag body, the regulating tether joining the occupant side wall and the vehicle body side wall for regulating a thickness of the airbag body as completely inflated, the tether being arranged generally along a transverse direction of the airbag body in such a manner as to partition the upstream part and the shin-protecting area; and
more than one tether located within the airbag body and arranged in a row in a vertical direction, each of the tethers joining the occupant side wall and the vehicle body side wall for regulating the thickness of the airbag body as completely inflated, and each of the tethers extending generally along the transverse direction of the airbag body;
wherein one of the tethers is the regulating tether, and one of the rest of the tethers constitutes a partitioning tether for partitioning the shin-protecting area for protecting shins and a knee-protecting area for protecting knees, in die downstream part;

wherein a sectional area of a flow path of inflation gas flowing toward the shin-protecting area from the upstream part in the regulating tether is controlled, such that there arises the time lag between peak times of internal pressures of the shin-protecting area and of the upstream part; and wherein a sectional area of the flow path of inflation gas flowing toward the shin-protecting area from the upstream part in the regulating tether is set smaller than a sectional area of the flow path of inflation gas flowing upward in the location of the one of the rest of the tethers;

wherein the regulating tether is joined to an all over inner circumference of the airbag body, and comprises a gas communication hole allowing the inflation gas to pass therethrough;

wherein each of the regulating tether and the partitioning tether is joined to an all over inner circumference of the airbag body, and comprises a gas communication hole allowing the inflation gas to pass therethrough;

wherein:

each of the regulating tether and the partitioning tether comprises more than one gas communication hole disposed side by side along transverse direction; and the gas communication holes of the regulating tether and the gas communication holes of the partitioning tether are in series configuration with one another in the vertical direction.

3. A knee-protecting airbag device comprising an airbag, the airbag, when fed with inflation gas, protruding rearward from a housing and deployable upward for protecting occupant's knees, wherein:

the airbag comprises:

an upstream part located toward a lower end of the completely inflated airbag and located upstream of inflation gas;

a downstream part located toward an upper end of the completely inflated airbag and located downstream of inflation gas, the downstream part protecting an area from shins to knees of the occupant when the airbags completely inflated, the downstream part of the airbag comprises a shin-protecting area for protecting the occupant's shins;

an airbag body including an occupant side wall located toward the occupant and a vehicle body side wall located toward the vehicle body, respectively when the airbag is completely deployed;

a regulating tether located within the airbag body, the regulating tether joining the occupant side wall and the vehicle body side wall for regulating a thickness of the airbag body as completely inflated, the tether being arranged generally along a transverse direction of the airbag body in such a manner as to partition the upstream part and the shin-protecting area; and more than one tether located within the airbag body and arranged in a row in a vertical direction, each of the tethers joining the occupant side wall and the vehicle body side wall for regulating the thickness of the airbag body as completely inflated, and each of the tethers extending generally along the transverse direction of the airbag body;

wherein one of the tethers is the regulating tether, and one of the rest of the tethers constitutes a partitioning tether for partitioning the shin-protecting area for protecting shins and a knee-protecting area for protecting knees, in the downstream part;

wherein a sectional area of a flow path of inflation gas flowing toward the shin-protecting area from the upstream part in the regulating tether is controlled, such that there arises the time lag between peak times of internal pressures of the shin-protecting area and of the upstream part; and wherein a sectional area of the flow path of inflation gas flowing toward the shin-protecting area from the upstream part in the regulating tether is set smaller than a sectional area of the flow path of inflation gas flowing upward in the location of the one of the rest of the tethers;

wherein the regulating tether is joined to an all over inner circumference of the airbag body, and comprises a gas communication hole allowing the inflation gas to pass therethrough;

wherein each of the regulating tether and the partitioning tether is joined to an all over inner circumference of the airing body, and comprises a gas communication hole allowing the inflation gas to pass therethrough;

wherein:

each of the regulating tether and the partitioning tether comprises more than one gas communication hole disposed side by side along the transverse direction; and the gas communication holes of the regulating tether and the gas communication holes of the partitioning tether are ranged in such a manner as to be dislocated from one another in the transverse direction, as viewed from above.

4. A knee-protecting airbag device comprising an airbag, the airbag, when fed with inflation gas, protruding rearward from a housing and deployable upward for protecting occupant's knees, wherein the airbag comprises:

an upstream part located toward a lower end of the completely inflated airbag and located upstream of inflation gas;

a shin-protecting area located above the upstream part at full airbag inflation for protecting shins of the occupant;

a knee-protecting area located above the shin-protecting area at full airbag inflation for protecting knees of the occupant;

a lower tether disposed generally along the transverse direction inside the airbag in such a manner as to partition the upstream part and the shin-protecting area, the lower tether including a first gas communication hole permitting inflation gas to flow from the upstream part to the shin-protecting area; and an upper tether disposed generally along the transverse direction inside the airbag in such a manner as to partition the shin-protecting area and knee-protecting area, the upper tether including a second gas communication hole permitting inflation gas to flow from the shin-protecting area to the knee-protecting area wherein the second gas communication hole has a greater opening area than that of the first communication hole and is arranged to be dislocated from the first communication hole in the transverse direction as viewed from above.

* * * * *